United States Patent [19]

Lamendola

[11] Patent Number: 5,279,214
[45] Date of Patent: Jan. 18, 1994

[54] BARBECUE ASSEMBLY

[76] Inventor: Jose V. Lamendola, 2418 SW. 99 Court, Miami, Fla. 33165

[21] Appl. No.: 729,717

[22] Filed: Jul. 5, 1991

[51] Int. Cl.$^5$ .................. A47J 37/04; A47J 37/07
[52] U.S. Cl. .................... 99/445; 99/446; 99/449; 99/482; 126/9 R; 126/25 R; 126/25 A
[58] Field of Search ............ 99/339, 340, 419, 421 R, 99/421 H, 448, 449, 450, 482, 444–446; 126/9 R, 9 B, 25 R, 25 A

[56] References Cited

U.S. PATENT DOCUMENTS

| 2,842,053 | 7/1958 | Reuland | 126/25 R |
| 3,691,935 | 9/1972 | Spetz | 99/339 |
| 3,809,051 | 5/1974 | Giroux | 126/9 R |
| 3,809,053 | 5/1974 | Navarro | 99/421 H |
| 3,982,476 | 9/1976 | McLane | 99/339 |
| 4,489,706 | 12/1984 | Hait | 126/9 R |
| 4,508,096 | 4/1985 | Slattery | 126/9 R |
| 4,658,710 | 4/1987 | Quet et al. | 99/450 |
| 4,706,817 | 11/1987 | Greathouse | 126/9 B |
| 4,721,037 | 1/1988 | Blosnich | 99/482 |
| 4,877,010 | 10/1989 | Hait | 126/9 R |

FOREIGN PATENT DOCUMENTS 3414251 10/1985 Fed. Rep. of Germany ...... 126/9 B Primary Examiner—Timothy F. Simone
Attorney, Agent, or Firm—James Wetterling

[57] ABSTRACT

A barbecue or outdoor grill or cooking assembly structured from a plurality of interlocking and cooperative components which are readily assembled and disassembled at a given site so as to allow the subject assembly to be easily installed and removed from a given location. The plurality of components define a substantially enclosed interior in which a grill assembly is adjustably positioned such that the grill portion thereof may be raised or lowered relative to a platform designed to support a fire bed or other heat generating source so as to regulate the heat applied to the food being cooked which is positioned on the adjustable grill portion of the grill assembly.

17 Claims, 3 Drawing Sheets

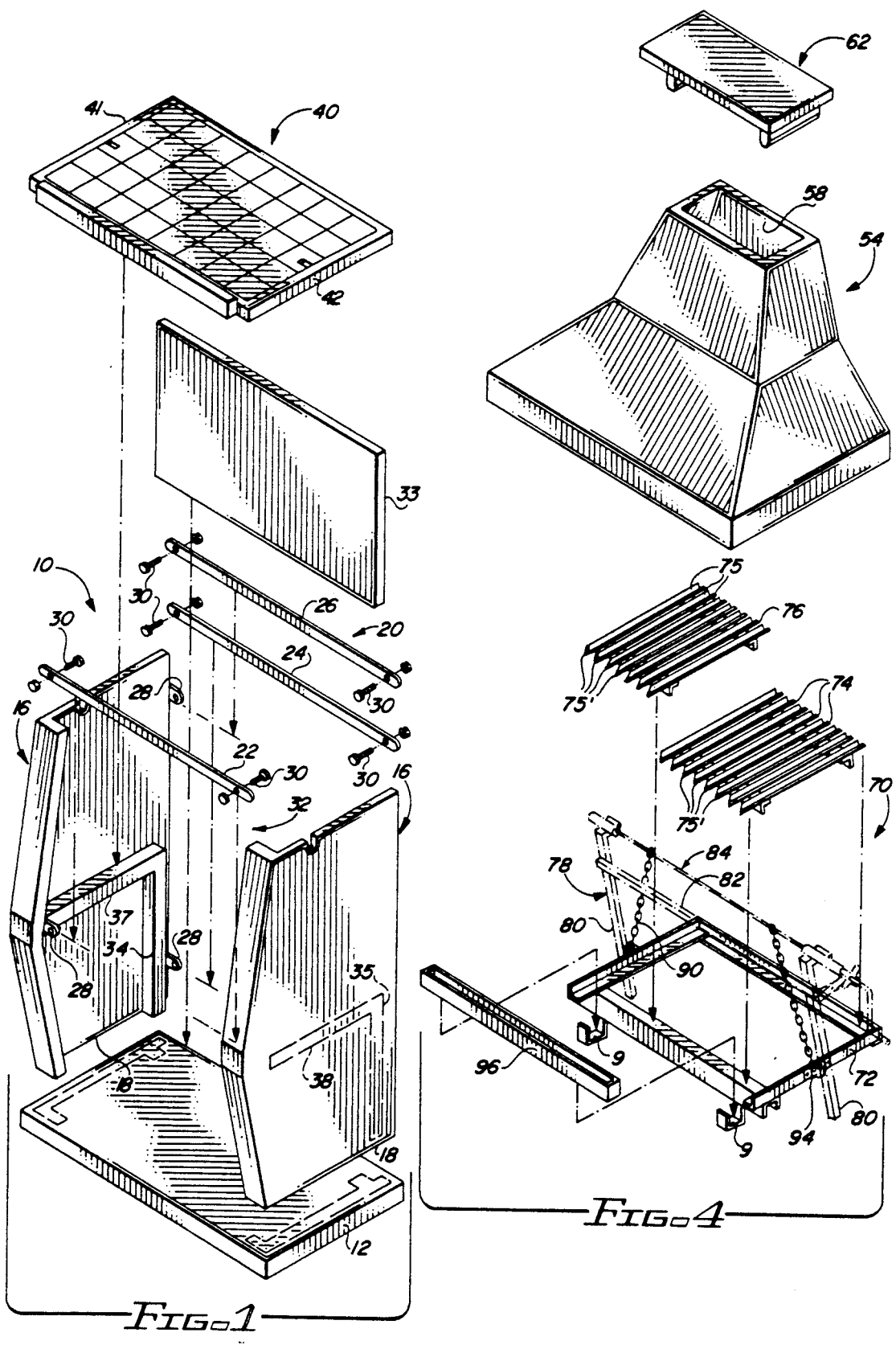

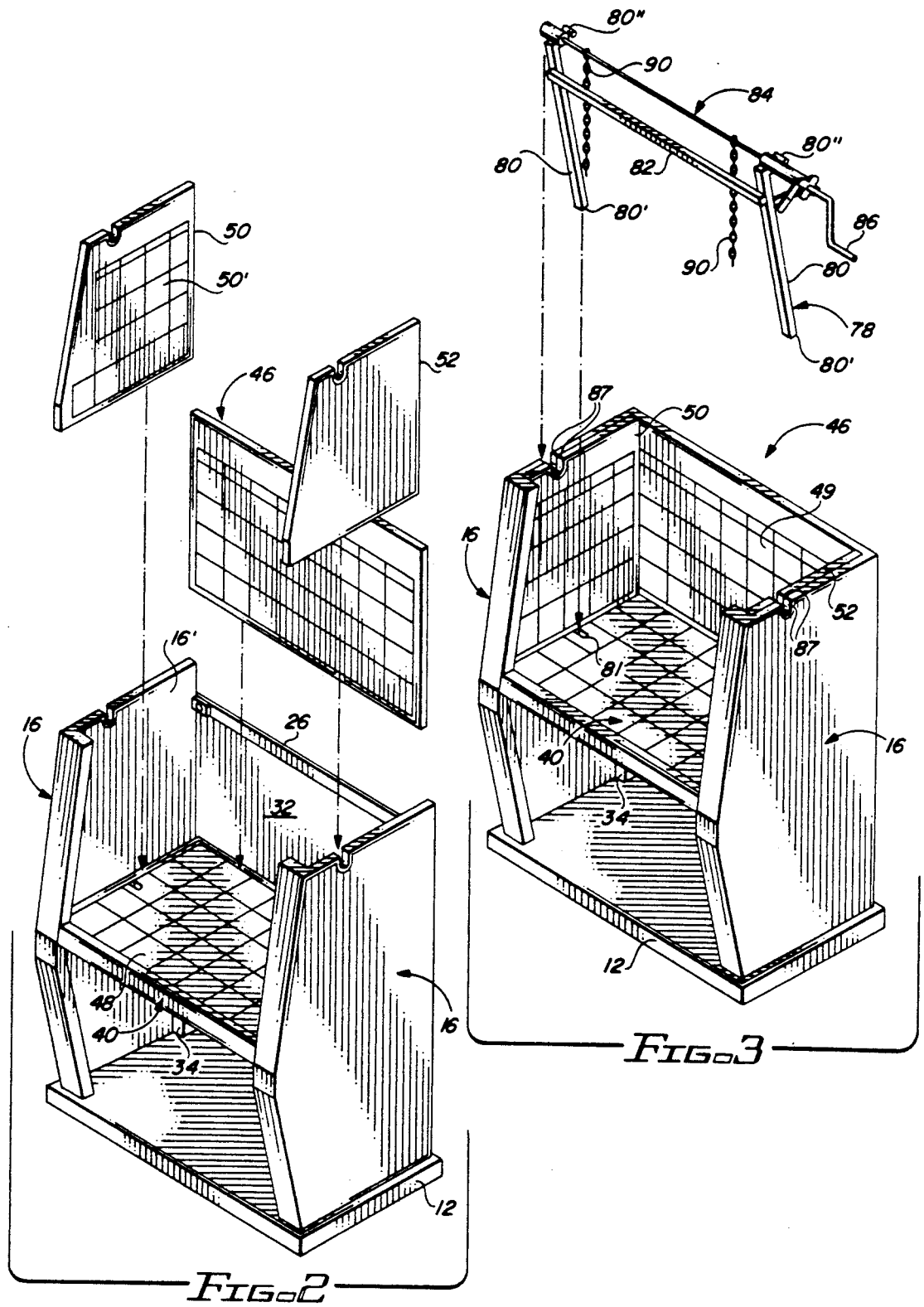

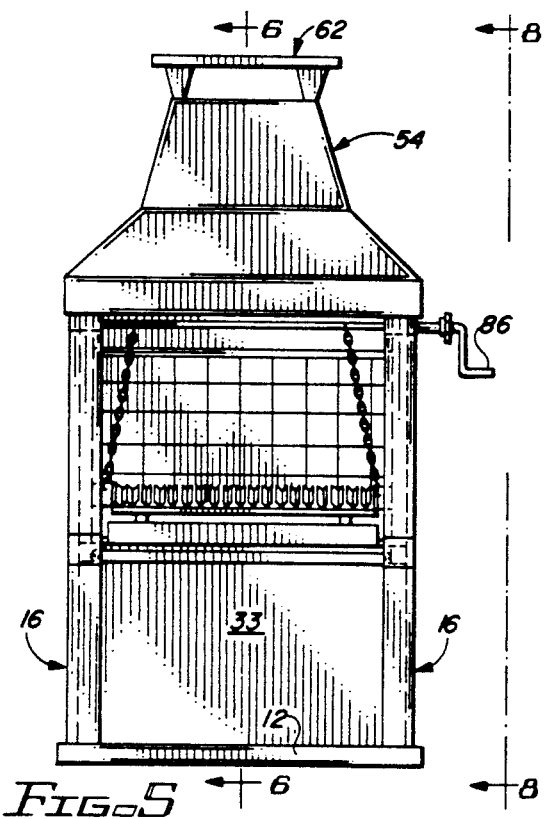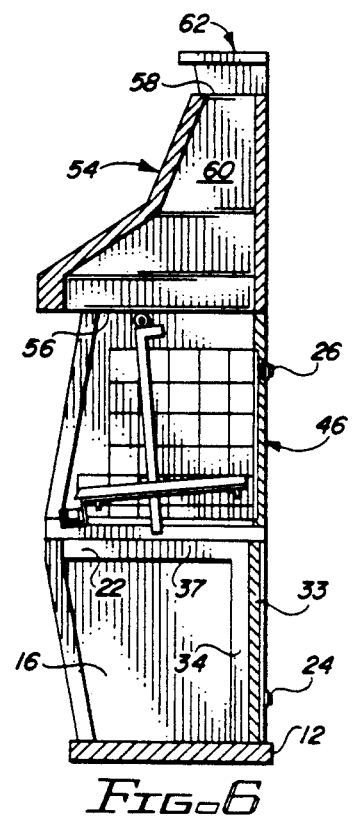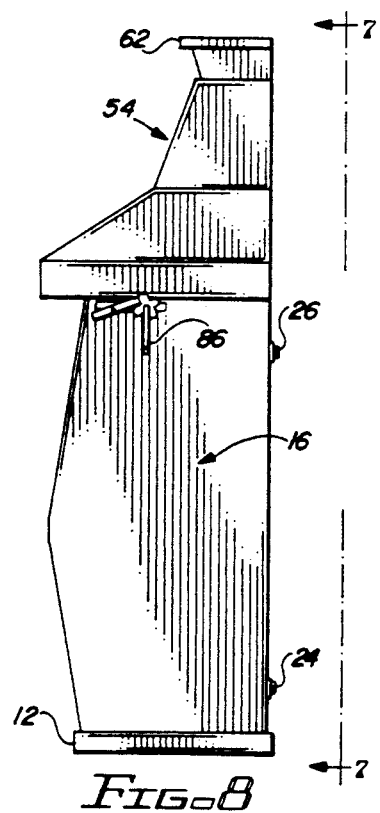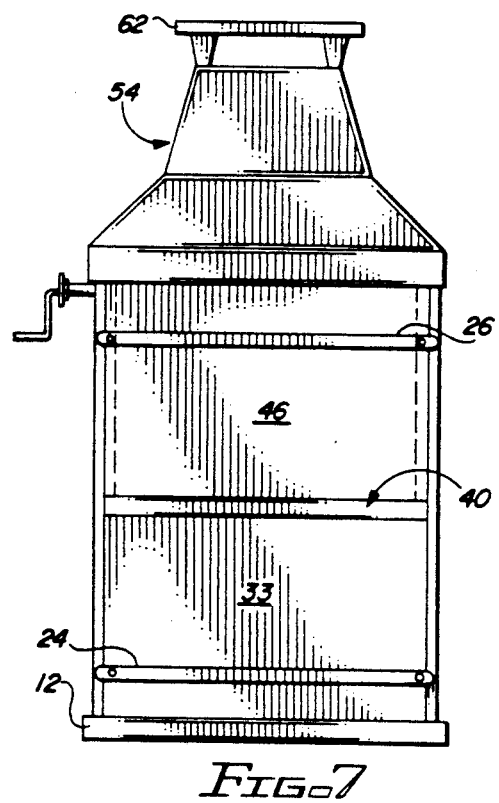

BARBECUE ASSEMBLY

BACKGROUND OF THE INVENTION

1. Field of the Invention

This invention relates to a barbecue or like cooking assembly made of heavy duty construction, but being specifically capable of being assembled or disassembled at a given outdoor location so as to facilitate initial installation and or transport the barbecue assembly between desired sites.

2. Description of the Prior Art

Outdoor cooking, more commonly known as barbecuing or the like, has enjoyed increased popularity in recent years. Typically, the facilities used to accomplish such outdoor cooking are known as barbecue assemblies and can range in structure from portable, substantially lightweight units to more permanent heavy duty installations located in a fixed position outdoors.

The portable or somewhat lightweight assemblies are commonly known as kettle type cookers and are formed from a metallic or heat resistant material and frequently are mounted on wheels or a movable support frame so as to allow easy positioning of the entire assembly into and out of an operative location, normally outdoors. While such portable or lightweight units are increasing in popularity due to their ease of positioning, etc., such units do not add to the overall attractiveness or aesthetic appearance of a given outdoor location, such as a patio, yard, pool deck, etc.

One problem associated with the more permanent barbecue assemblies is their structural installation, which previous to the present invention, necessitated them being positioned at a permanent site rather than being capable of being removed, such as when the owners of a given home or like area move to a different locale. The referred to permanent structural installations are formed from a masonry, concrete, cementious material or the like and are permanently affixed to the ground or like supporting surface such that such facilities cannot be removed without being destroyed. The other advantages associated with the permanent facilities is generally a much larger capacity and, as set forth above, the overall improvement in the aesthetic appearance since the design of such permanent structures can be specifically adapted to cooperate with the surrounding environment or structure of a person's home, pool deck, etc.

There is an obvious need, therefore, for a barbecue or like cooking assembly which has what may be referred to as a heavy duty construction, formed of a masonry, concrete or cementious material like substance yet which is defined by a plurality of components removably interconnected to one another so as to facilitate easy installation as well as a knock down or disassembly of the subject structure thereby enabling the structure to be moved from one site to another, such as when a user sells his home and moves to a different locale. Such a preferred barbecue assembly further has the advantage of essentially prefabricating the components at a given site and thereby enabling more of a mass production type of manufacturing technique in order that a plurality of such barbecue assemblies can be "pre-made" and brought to a given, on-site location for assembly as desired by the user. The overall cost of production and assembly as well as the time and skill involved in the constructing of such a preferred barbecue assembly is greatly enhanced.

SUMMARY OF THE INVENTION

This invention relates to a barbecue or like outdoor cooking assembly specifically comprising a plurality of removably attached and cooperating components which enable the subject barbecue assembly to be readily assembled and disassembled at a given preferred site. In addition, each of the aforementioned components may be pre-fabricated at a plant or other central location and collectively transported to a site of installation and assembly. By virtue of this type of construction, both the production costs and costs of installation may be greatly reduced. In addition, greater versatility is provided with the subject barbecue assembly over other barbecue assemblies which are, in effect, permanently installed or built at a given site of use. For example, when a user is moving or relocating to a different place of residence, the barbecue assembly may be disassembled and stored with relative ease and without the requirement of skilled labor or tooling. The disassembled components may therefore be transported to the new site of use and reassembled, again without the need for special tooling or skilled labor.

As pointed out in greater detail hereinafter, the material from which the various components of the barbecue assembly are formed are preferably a stone like masonry, cementious material, or concrete type substance which is relatively heavy to insure its stability and also present the appearance of a permanent installation.

More specifically, the plurality of cooperative components include a base initially mounted on the ground or other supporting surface at the site of the assembly and location of the formed barbecue assembly. Two spaced apart elongated support members each defining a side of the assembly have their lower end mounted on the base and extend upwardly therefrom in spaced apart substantially parallel relation to one another. A brace means serves to interconnect and maintain the two side support panels in the upright, spaced relation to one another. A platform is next removably positioned on the interior of the panels between such panels such that an opposite end of the platform is supported on a mounting flange integrally formed to the inner surface thereof and projecting outwardly therefrom.

This platform is used to support the fuel for the fire as well as the fire itself or other comparable heat generating means and further defines the floor of what may be referred to as an at least partially enclosed interior of the barbecue assembly.

A back panel is next removably connected adjacent the lower ends of the support panels and between such support panels in somewhat covering relation to a lower portion of a back opening initially extending between the support panels. Similarly and cooperatively, a rear panel is connected substantially between an upper end of the support panels and also in substantially covering relation to the back opening. The rear panel, just described, and the back panel, previously described, are cooperatively disposed so as to be substantially coplaner and collectively cover the back opening.

Therefore, the at least partially enclosed interior of the assembly in which the fire, fuel or like heat source is located is at least partially defined by inner surfaces of upper portions of the support panels, the rear panel and a canopy structure which is removably mounted on top of the side support panels.

The canopy is preferably structured in the form of a chimney assembly having an entrance opening and an exit opening.

The entrance opening is somewhat larger and is disposed in overlying relation to the interior of the barbecue assembly so as to receive fumes and exhaust therefrom when the heat source is ignited. The exit opening is located at an upper or top end of the chimney structure and communicates with atmosphere for the venting of exhaust and fumes thereto.

A lining means in the form of sheets, panels or the like of heat resistant material may be removably disposed in overlying relation to inner surfaces defining the boundaries of the at least partially enclosed interior of the barbecue assembly. Alternately, such heat resistant material may be affixed to and be a permanent part of the platform as well as the rear panel positioned as described above to also define the boundaries of the interior of the barbecue assembly.

An important feature of the present invention is the existence of an adjustable and removably mounted grill means which is used to support the food to be cooked and also allow, adjustable positioning of the grill portion defined by one or more grill segments in a preferred position relative to the heat source as well as the floor on which the heat source, coals or like heat generating composition is disposed. Such a grill means includes a stanchion means for upright and operative support of the remainder of the grill assembly. A positioning means in the form of a crank arm extends transversely across the interior and includes depending support chains hanging therefrom and capable of being wrapped around the crank arm when such crank arm is rotated. The opposite ends of each of the support chains, cables or the like, are connected to the grill portion. Rotation of the crank arm in one of two opposite directions serves to either raise or lower the grill portion by wrapping or unwrapping the support chains about the crank arm as will become obvious.

The grill portion or grill segments are mounted on a grill support frame and the frame itself is connected to the stanchion means in a manner so as to maintain declining, angular orientation of the grill portion regardless of its position relative to the fire. This angular orientation facilitates draining of any excess oil, grease, or the like into a grease catch defined by an elongated trough cooperatively structured to move with the grill portion.

Accordingly, an important feature of the present invention is that all of the aforementioned components are easily disconnected from one another and may be made and/or constructed separately in a pre-fabricated style and packaged and transported to the site of installation or use as preferred by the user. Further, these components can be readily disassembled without the necessity of using any specialized tooling or skilled labor when the user desires to dismantle the subject barbecue assembly for transport to another site of use.

BRIEF DESCRIPTION OF THE DRAWINGS

For a fuller understanding of the nature of the present invention, reference should be had to the following detailed description taken in connection with the accompanying drawings in which:

FIG. 1 is an exploded view of cooperative, removably components of the subject barbecue assembly.

FIG. 2 is a perspective view in exploded form of additional components of the embodiment of FIG. 1.

FIG. 3 is a perspective view in exploded form of yet additional components of the embodiments of FIGS. 1 and 2.

FIG. 4 is a perspective view in exploded form of a grill assembly associated with the barbecue assembly of the present invention and an accompanying canopy structure.

FIG. 5 is a front view of the subject invention in assembled form.

FIG. 6 is a transverse sectional view along line 6—6 of the FIG. 5.

FIG. 7 is a rear view along line 7—7 of FIG. 8.

FIG. 8 is an end view along line 8—8 of FIG. 5.

Like reference numerals refer to like parts throughout the several views of the drawings.

DETAILED DESCRIPTION OF THE PREFERRED EMBODIMENT

As shown in the accompanying figures, the barbecue assembly is generally indicated as 10 and is shown in completely assembled form in FIGS. 5 through 8. However, one important feature of the present invention is the removable interconnection of the plurality of components defining the subject assembly in a manner that allows the assembly or disassembly of the various components so as to facilitate production, installation and dismantling when such is desired. With regard to FIGS. 1 through 4, the barbecue assembly 10 comprises a base as at 12 designed to be positioned on the ground or like supporting surface at the site of assembly where use of the subject barbecue assembly 10 is to take place.

Two support structures more specifically defined by support panels 16 are mounted such that their lowermost ends 18 are positioned, as shown in FIG. 1, on an upper exposed surface of the base 12. Support panels have somewhat of an elongated configuration and, as shown, are disposed to define opposite sides of the assembly and are maintained in an upright, spaced apart substantially parallel relation to one another. Such preferred operative position of the support panels 16 occurs through provision of a brace means generally indicated as 20 in its disassembled form. More specifically, the brace means comprises a plurality of elongated iron or similar high strength metallic or like material as at 22, 24 and 26. Each of these brace members 22 through 26 have their opposite ends connected to connecting flanges or members as at 28 such that the brace members extend between and serve to interconnect the support panel 16 in their preferred, operative position as clearly shown. Removable interconnection of the opposite ends occurs by conventional nut and bolt type of connectors as at 30 or other equivalent type of connectors which facilitate both the attachment and detachment of the brace members 22, 24 and 26 in their intended, interconnecting position without the use of specialized tooling.

Next, by means of assembly, a back panel as at 33 is disposed to overly or substantially cover a back opening generally indicated as 32 in FIG. 1 substantially adjacent a lower end or half of the spaced apart support panels 16 in the manner best shown in FIGS. 1, 5 and 7. This back panel is disposed interiorly of the brace member 24 and in somewhat sandwiched relation between a pair of interior mounting flanges as at 34 and 35. Such mounting flanges 34 and 35 (35 not shown for purposes of clarity) are more specifically defined by a mounting flange segment 34 and 35 which is an integral part of a horizontal segment as at 37 which are integrally connected to and extend outwardly from an inner surface of each of the support panels 16. The platform 40 therefore is removably mounted on the mounting flange segments 37 and 38 in a horizontal orientation so as to support coals, fuel or any heat generating composition thereon so as to substantially heat the enclosed interior as defined above. A rear panel generally indicated as 46 (see FIGS. 2 and 3) is the upper back opening as at 32' (see FIG. 2) and is disposed on the interior of the brace member 26 in interconnecting relation to the interior upper ends of the support panels 16 as clearly shown in FIG. 3. With reference to FIG. 7, it is seen that the back panel 33 and the lower panel 46 thereby completely cover the back opening 32 and are separated by the horizontal orientation and positioning of the platform or fire floor 40.

Additional features of the present invention include a lining means. This lining means is to protect the various components from heat which is generated, possibly for prolonged periods on the interior defined by the panels 16, platform 40 and rear panel 46. Such lining means may include heat resistant material permanently affixed to and movable with the floor 40 and the rear panel 46 and defining at least a portion of the exposed surface thereof. Such heat resistant material is indicated respectively as 48 and 49 on the platform 40 and the rear panel 46.

In addition, the lining means includes two lining panels 50 and 52 which are insertable in overlying, covering relation to interior surface portions 16' of the oppositely disposed, spaced apart support panel 16 as best shown in FIGS. 2 and 3. Exposed surfaces of these lining panels 50 and 52 have the heat resistant material as at 50' fixedly and/or permanently secured thereto as shown. Therefore, the exposed surface of the interior of the assembly, most subject to the excessive heat generated by a combustible fuel source would be protected by the heat resistant material as at 48, 49 and 50'.

Another removable component is best shown in FIGS. 4 through 8 and includes a canopy 54 designed to be mounted generally on top of and in removable supported engagement with the uppermost ends of the support panels 16 as well as the rear panel 46. The canopy 54 is preferably in the form of a chimney structure having a somewhat hollow interior 60. The hollow interior 60 communicates with an entrance opening 56 disposed in direct overlying relation to the at least partially enclosed interior and an exit opening 58 (see FIG. 6) wherein the fumes or exhaust passing into the interior of the chimney 60 travels along the path of fluid flow defined thereby and exits into the atmosphere through the exit opening 58. Further, a cover as at 62 is provided in somewhat overlying but spaced relation to the exit opening 58 so as to restrict the entrance of rain water or other elements passing into the interior of the chimney 60 and entering into the substantially enclosed interior of the barbecue assembly adjacent to the heat source disposed on the floor or platform 40. As set forth above, the canopy 54 as well as the cover 62 are removable from their remaining components of the subject barbecue assembly and are of course detachable from one another.

Yet another important feature of the present invention is best pictured in FIG. 4 with additional reference to FIGS. 2 and 3. This additional plurality of components comprises a grill means generally indicated as 70.

The grill means includes a support frame 72 and a grill portion defined by at least one but preferably plurality of grill structures 74 and 76. Grill structure or structures 74, 76 rest on and are supported by the support frame 72. The grill means further includes a stanchion means generally indicated in FIG. 3 as 78 and represented in phantom lines in FIG. 4. Stanchion means includes two spaced apart elongated support elements or stanchion members 80 disposed within the enclosed interior by having their lowermost ends as at 80' pass into receiving slots 81 formed in the floor or platform 40. Supplementary brace bar as at 82 may have its opposite ends fixedly and/or removably connected to the stanchion members 80 so as to maintain them in their spaced apart upright orientation as they extend upwardly from the floor or platform 40 towards the upper or open top of the support panel 16 and rear panel 46. The stanchion members 80 serve to rotatably support and have connected thereto a positioning means in the form of a crank arm or shaft 84 which is manually rotatable by a crank handle 86 and is rotatably affixed to the uppermost ends 80'' of the stanchion members 80. Receiving slots or openings 87 are formed in aligned relation on both the side panels 16 and the lining panels 50 and are indicated as 87 in both. Receiving slots engage the crank arm or shaft and allow rotation thereof relative to the support panels and/or lining panels as clearly apparent. Two depending support chains 90 have one end affixed to the crank arm 84 and may be rotated thereon or removed therefrom depending upon the direction of rotation of the crank shaft 84. The opposite or lowermost ends of the support chains 90 are connected as shown in FIG. 4 to the support frame 72. It should be apparent that rotation of the crank shaft 84 by manipulation by the crank handle 86 will cause a raising or lowering of the support frame 72 as well as the grill structures or segments 74 and 76 mounted thereon.

Guide means as at 94 are further affixed to opposite ends of the support frame 72 and cooperate to slide along the length of the stanchion members 80 so as to maintain a preferred angular, declining orientation of the grill segments 74 and 76 as they extend from the rear panel 46 towards the front opening between the front longitudinal edges of the support panel 16 above the platform or floor 40. Such an angular declining orientation is best shown in FIG. 6.

A removable elongated trough as at 96 is removably mounted in the holding members 98 also affixed and movable with the support frame 72 a best shown in FIG. 4. This elongated trough 96 defines a grease catch such that the declining angular orientation of a plurality of channels 75 defining, in part, the grill structure 74 and 76 will facilitate travel and collection of excess grease, oils or like debris passing from the food being cooked once it is placed on the grill segments or structures 74 and 76. While the specific structure of the channels 75 may vary, they are preferably in a somewhat V-shaped construction and, due to their angular orientation, will serve to collect the fat or oil from the food being cooked and allow it to pass, by gravity, off the front-most ends thereof as at 75' and into the grease catch 96 defined by the trough 96.

Now that the invention has been described,
What is claimed is:

1. A barbecue assembly comprising a plurality of removably attached components enabling selective assembling and disassembling thereof said barbecue assembly comprising:

a) a base disposed on a supporting surface and two vertically oriented, substantially elongated support panels mounted on lower ends thereof to said base and extending upwardly from said base in spaced relation to one another, b) brace means removably attached in interconnecting relation to said support panels for maintaining said support panels in an upright spaced relation to one another, c) a platform removably mounted on the interior and between said support panels and adapted to support a heat generating composition thereon, d) a rear panel removably mounted between said support panels and extending upwardly from said platform in substantially covering relation to a rear opening between said support panels, e) an at least partially enclosed interior including boundaries defined by said rear and support panels and said platform, f) grill means for supporting food within said interior and above said platform and removably mounted within said interior and adjustably positionable relative to said platform, g) said grill means comprising a grill portion and a stanchion means for supporting said grill portion and said stanchion means being removably positioned within said at least partially enclosed interior and extending upwardly from said platform, and h) canopy means removably mounted above said support panels and adapted for overlying and covering relation to said interior and said grill means.

2. An assembly as in claim 1 wherein said support panels are formed of a masonry like, cementious material of sufficient weight and structure to support and retain a remainder of said components in an operative position.

3. An assembly as in claim 2 wherein said support panels are disposed in an upright, substantially parallel relation to one another.

4. An assembly as in claim 1 further comprising a lining assembly disposed within said interior and positioned and structured to define inner surface portions of said at least partially enclosed interior and formed of a heat resistant material.

5. An assembly as in claim 4 wherein said lining assembly includes two lining panels each disposed in overlying relation to an inner surface portion of a different one of said support panels.

6. An assembly as in claim 5 wherein said lining assembly further includes said heat resistant material secured and defining an exposed surface of said platform.

7. An assembly as in claim 4 wherein said lining assembly further includes said heat resistant material fixedly secured and defining an exposed surface of said platform and said rear panel.

8. An assembly as in claim 1 wherein said canopy means comprises a chimney structure, including an entrance disposed in fluid communication with said at least partially enclosed interior and an exit spaced from said entrance and connected in fluid communication therewith by a substantially hollow interior defining a path of fluid flow for exhaust issuing from said at least partially enclosed interior.

9. An assembly as in claim 8 wherein said chimney structure further includes a cover disposed in overlying relation to said exit and structurally adapted to resist rain flow from passing through said chimney structure into said at least partially enclosed interior.

10. An assembly as in claim 1 further comprising a back panel connected to and between lower, rear portions of said support panels and oppositely and cooperatively disposed relative to said rear panel to substantially cover said rear opening along at least a majority of the length of said support panels.

11. An assembly as in claim 1 further comprising mounting means formed on inner surface portions of each support panel and extending outwardly therefrom and adapted for support of opposite ends of said platform.

12. An assembly as in claim 11 wherein said mounting means comprises two elongated, protruding flanges each integrally formed on a different inner surface of different ones of said support panels, said protruding flanges cooperatively positioned and adapted to support opposite ends of said platform thereon in a substantially horizontal orientation.

13. An assembly as in claim 1 wherein said brace means comprises a plurality of elongated brace members formed of a high strength material and having opposite ends of each member removably connected to one of said support panels, said brace members extending across a front and said rear openings of said support panels in interconnecting relation thereto.

14. An assembly as in claim 1 wherein said grill means further comprises a positioning means supported on said stanchion means and movably connected to said grill portion, said positioning means adapted to selectively raise or lower said grill portion relative to said platform and any heat generating composition disposed thereon.

15. An assembly as in claim 14 wherein said grill means further comprises a support frame disposed in removable supporting engagement with said grill portion; and guide means movably interconnecting said support frame to said stanchion means.

16. An assembly as in claim 14 wherein said grill portion comprises a plurality of elongated spaced apart and substantially parallel channels disposed insubstantially coplaner relation and collectively disposed in angularly declining orientation from said rear panel toward a front opening and selectively positionable along said stanchion means while in said declining orientation in spaced relation to said platform.

17. An assembly as in claim 16 wherein said grill means further includes a grease catch movable with said grill structure to said stanchion means and comprising an elongated trough disposed transversely along a front end of said channels in liquid receiving relation thereto.

* * * * *